United States Patent
Li et al.

(10) Patent No.: US 10,761,892 B2
(45) Date of Patent: Sep. 1, 2020

(54) METHOD AND ELECTRONIC DEVICE FOR EXECUTING DATA READING/WRITING IN VOLUME MIGRATION

(71) Applicant: AccelStor Ltd., Taipei (TW)

(72) Inventors: Pao-Chien Li, Taipei (TW); Shih-Chiang Tsao, Taipei (TW)

(73) Assignee: ACCELSTOR TECHNOLOGIES LTD, Shanghai (CN)

( * ) Notice: Subject to any disclaimer, the term of this patent is extended or adjusted under 35 U.S.C. 154(b) by 236 days.

(21) Appl. No.: 15/866,985

(22) Filed: Jan. 10, 2018

(65) Prior Publication Data

US 2019/0213045 A1    Jul. 11, 2019

(51) Int. Cl.
    *G06F 16/11*    (2019.01)
    *G06F 9/50*     (2006.01)
    *G06F 9/48*     (2006.01)
    *G06F 3/06*     (2006.01)

(52) U.S. Cl.
    CPC .......... *G06F 9/5044* (2013.01); *G06F 3/0617* (2013.01); *G06F 3/0619* (2013.01); *G06F 3/0647* (2013.01); *G06F 3/0683* (2013.01); *G06F 9/4881* (2013.01); *G06F 16/119* (2019.01)

(58) Field of Classification Search
    None
    See application file for complete search history.

(56) References Cited

U.S. PATENT DOCUMENTS

| | | | | |
|---|---|---|---|---|
| 7,240,122 B2* | 7/2007 | Sato | ...................... | H04L 29/06 709/232 |
| 7,302,541 B2* | 11/2007 | Hirezaki | ................. | G06F 3/061 710/28 |
| 8,078,814 B2* | 12/2011 | Emaru | .................. | G06F 3/0605 707/664 |
| 8,719,533 B2* | 5/2014 | Terayama | ............. | G06F 3/0607 711/154 |
| 8,818,936 B1* | 8/2014 | Haase | ................. | G06F 11/2069 707/610 |
| 10,268,612 B1* | 4/2019 | Bshara | .................... | G06F 13/30 |
| 2010/0131728 A1* | 5/2010 | Miyamae | ............. | G06F 3/0605 711/162 |
| 2017/0371887 A1* | 12/2017 | Balasubramanian | ........................ | G06F 16/119 |

* cited by examiner

*Primary Examiner* — Elias Mamo
(74) *Attorney, Agent, or Firm* — Birch, Stewart, Kolasch & Birch, LLP

(57) ABSTRACT

A method and an electronic device for executing data reading/writing in volume migration are provided. The method includes: preventing a read/write action on a first volume; switching an execution object of the read/write action to a brand new second volume; releasing the read/write action so that the read/write action is executed on the second volume; and migrating data in the first volume to the second volume, and during migration, if the second volume already has data, skipping migrating content at a corresponding address in the first volume to the second volume.

10 Claims, 8 Drawing Sheets

METHOD AND ELECTRONIC DEVICE FOR EXECUTING DATA READING/WRITING IN VOLUME MIGRATION

BACKGROUND

Technical Field

The present invention relates to a data read/write method, and in particular, to a method and an electronic device for executing data reading/writing in volume migration.

Related Art

Generally, after a storage system completes disk planning, available space is fixed. Afterwards, utilization of storage space becomes more flexible because of the development of a thin provisioning technology. When the storage space is insufficient, the storage space still needs to be increased by using a scale up technology. However, when the scale up technology is used, the storage system needs to be stopped temporarily (suspended) for hardware device expansion. Another improved scale up technology does not need to stop the hardware device of the storage system, but upgrades the storage system in a dynamic expansion manner. However, this still needs upgrade time. During the upgrade, a user still cannot write data.

SUMMARY

In view of this, the present invention provides a method and an electronic device for executing data reading/writing in volume migration. During data migration of a volume, a user can still execute a read/write action without affecting an operation of a user. The present invention is applicable to requirements such as storage space expansion or data backup.

The method for executing data reading/writing in volume migration includes: preventing a read/write action on a first volume; switching an execution object of the read/write action to a brand new second volume; releasing the read/write action so that the read/write action is executed on the second volume; and migrating data in the first volume to the second volume, and during migration, if the second volume already has data, skipping migrating content at a corresponding address in the first volume to the second volume.

The electronic device for executing data reading/writing in volume migration includes a storage module and a control module. The storage module includes a plurality of volumes, and the plurality of volumes includes a first volume and a second volume. The control module is electrically connected to the storage module, and the control module includes a locking unit, an adjustment unit, and an execution unit. The locking unit prevents a read/write action on the first volume. The adjustment unit switches an execution object of the read/write action to the brand new second volume. The execution unit executes the read/write action. After the execution object of the read/write action is switched to the second volume, the locking unit releases the read/write action so that the execution unit executes the read/write action on the second volume and migrates data of the first volume to the second volume. During migration, if the second volume already has data, content at a corresponding address in the first volume is not migrated to the second volume.

In an embodiment, the read/write action is reading according to a read address of the second volume.

In an embodiment, if no data is read from the read address of the second volume, the execution unit reads data from an address that corresponds to the read address and that is in the first volume.

In an embodiment, the read/write action is writing data to an address that corresponds to a write address of the first volume and that is in the second volume.

In an embodiment, the first volume may be a cloned volume of an original volume.

DETAILED DESCRIPTION

Figure 1:
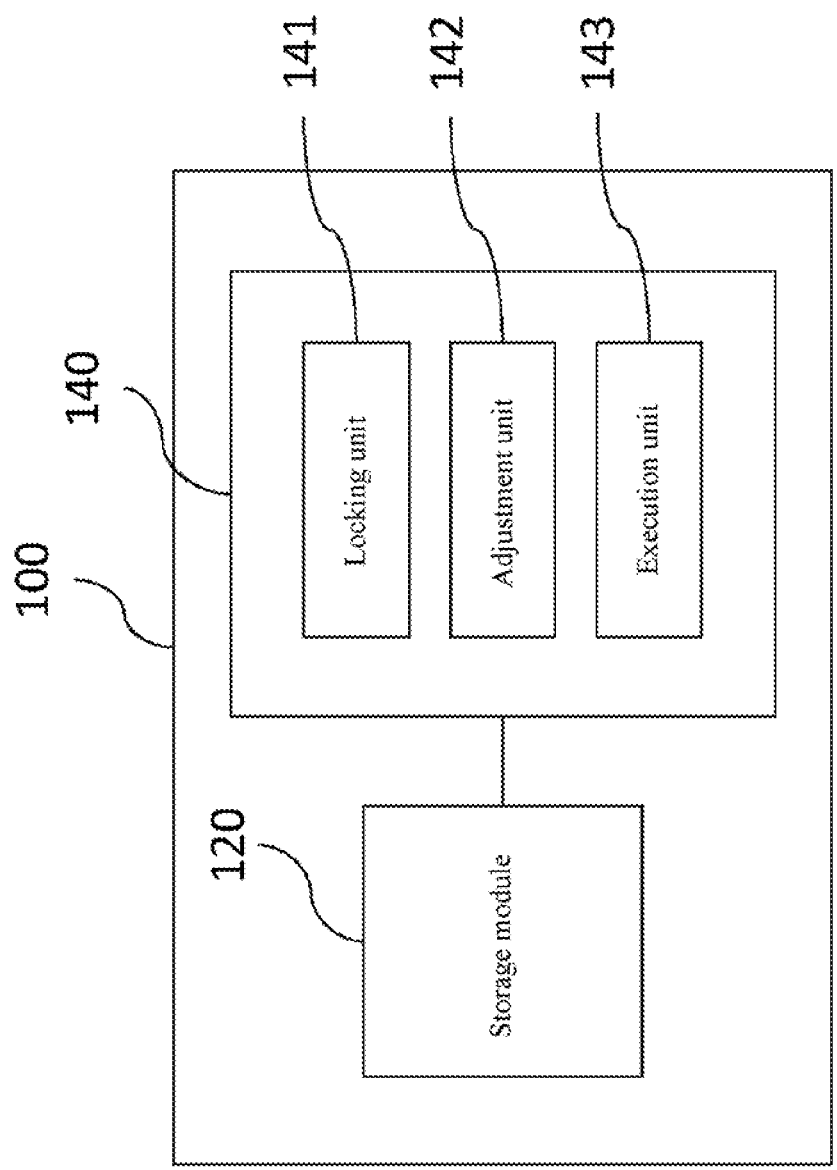
FIG. 1 is a schematic block diagram of an electronic device for executing data reading/writing in volume migration according to an embodiment of the present invention.

Referring to FIG. 1 in combination, FIG. 1 is a block diagram of an electronic device 100 for executing data reading/writing in volume migration according to an embodiment of the present invention. The electronic device 100 includes a storage module 120 and a control module 140. The storage module 120 is electrically connected to the control module 140. The control module 140 includes a locking unit 141, an adjustment unit 142, and an execution unit 143.

In an embodiment, the electronic device 100 may be a computing device such as a personal computer, a notebook computer, or a server. The storage module 120 may be a storage device such as a magnetic disk, a solid-state disk, a disk array, or an all-flash array. The control module 140 is a processor and can execute code for implementing a method for executing data reading/writing in volume migration. The locking unit 141, the adjustment unit 142, and the execution unit 143 are separately different code sections executed by the processor to implement different functions.

Figure 2:
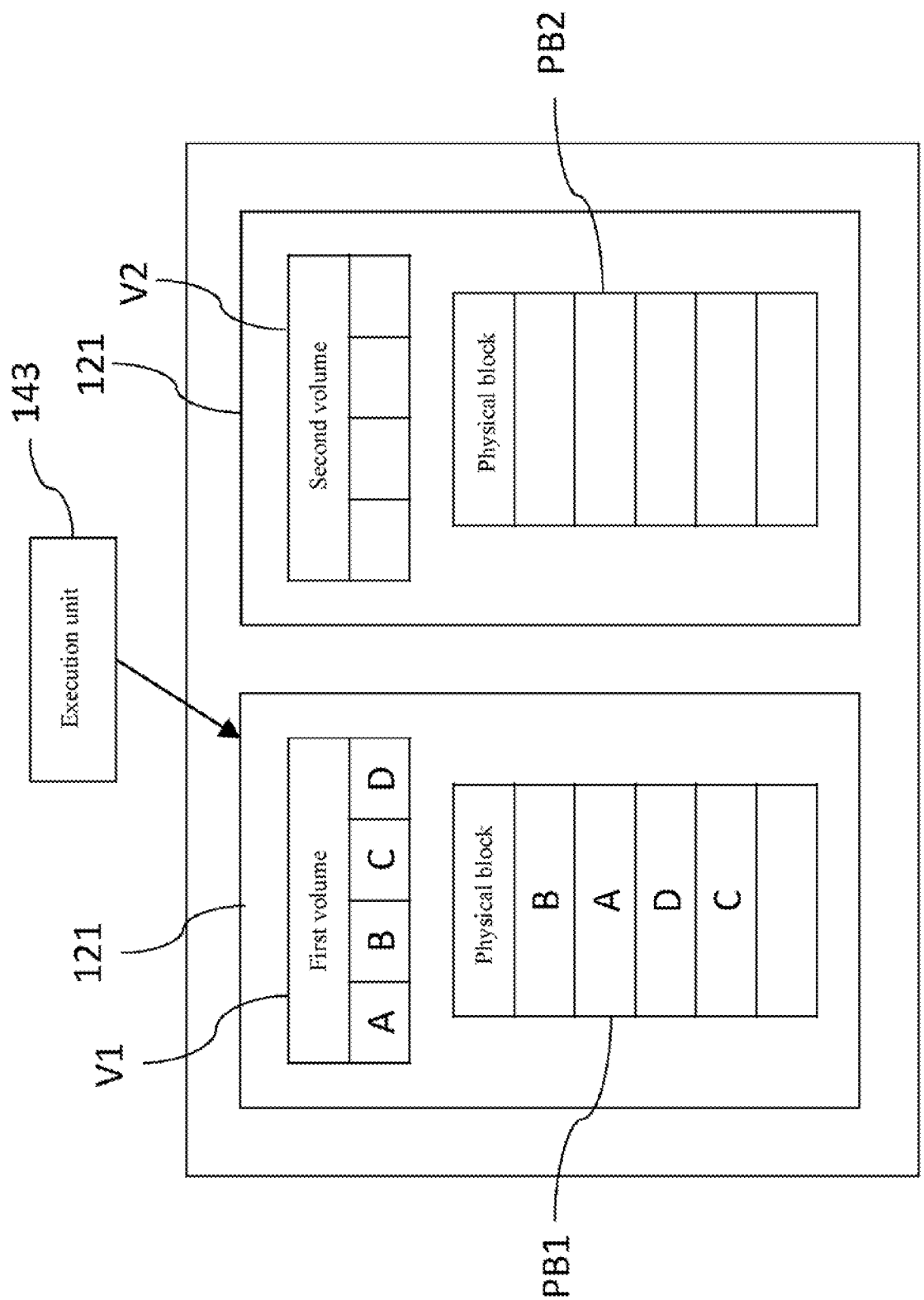
FIG. 2 is a schematic diagram (1) of data migration according to an embodiment of the present invention.

Referring to FIG. 2, FIG. 2 is a schematic diagram (1) of data migration according to an embodiment of the present invention. A storage module 120 includes a plurality of volumes, which is logical storage space. The volumes are described by using a first volume V1 and a second volume V2 as an example. Herein, the first volume V1 is a source volume and the second volume V2 is a target volume. That is, the data migration means that data of the first volume V1 is migrated to the second volume V2. The second volume V2 is a brand new volume. That is, the second volume V2 is a newly created volume on which no data is recorded. That is, data stored in each address is null. Herein, the first volume V1 and the second volume V2 are located in different storage devices 121. However, in some embodiments, the first volume V1 and the second volume V2 may be located in a same storage device 121.

Figure 3:
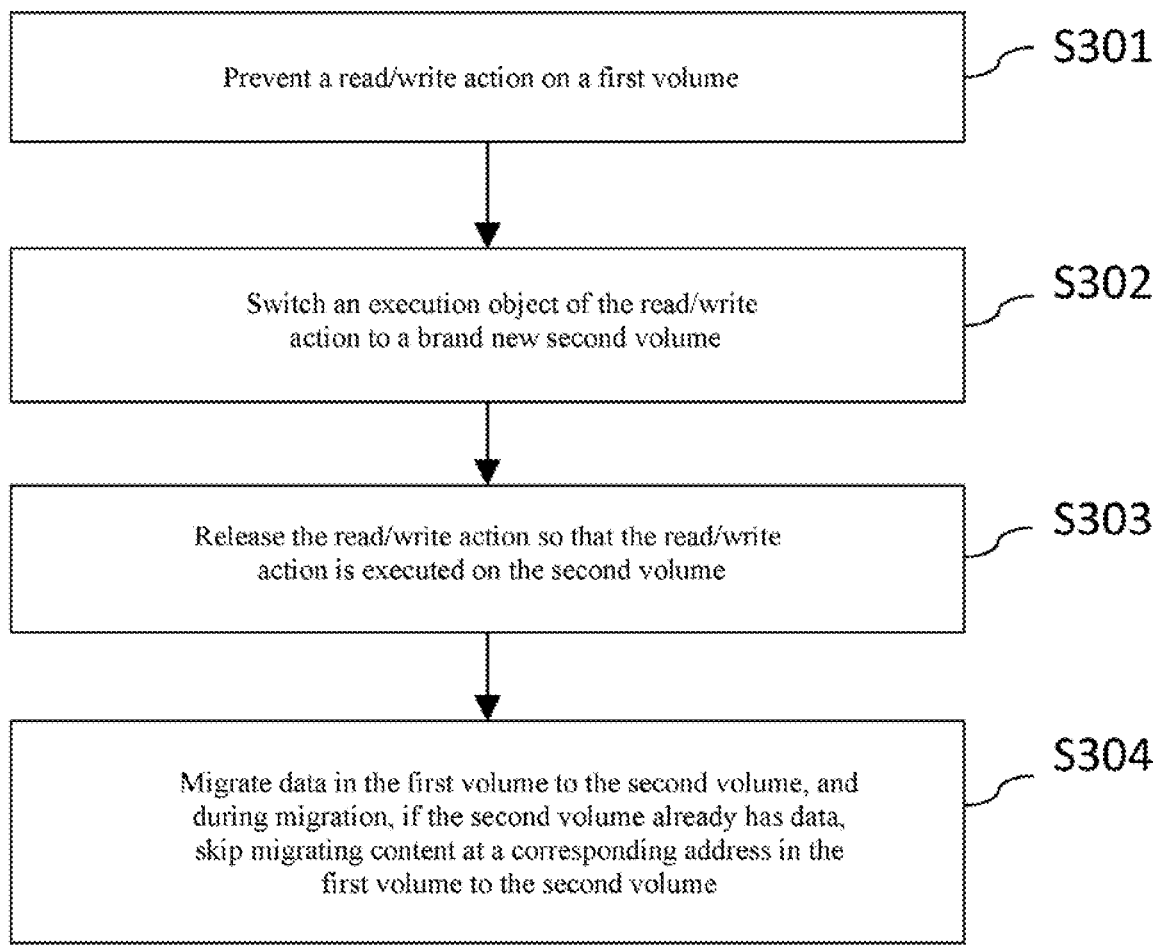
FIG. 3 is a method flowchart of an electronic device for executing data reading/writing in volume migration according to an embodiment of the present invention.

FIG. 3 is a method flowchart of an electronic device 100 for executing data reading/writing in volume migration according to an embodiment of the present invention. Referring to FIG. 3, before data is migrated, a locking unit 141 first prevents a read/write action that is executed on a first volume V1 by a user of the electronic device 100 (step S301). Specifically, when detecting an instruction corresponding to the read/write action, the locking unit 141 first puts the instruction in a queue (not shown in the figure) so that the read/write action is not executed immediately. In this case, the read/write action may be a read action or a write action.

Figure 4:
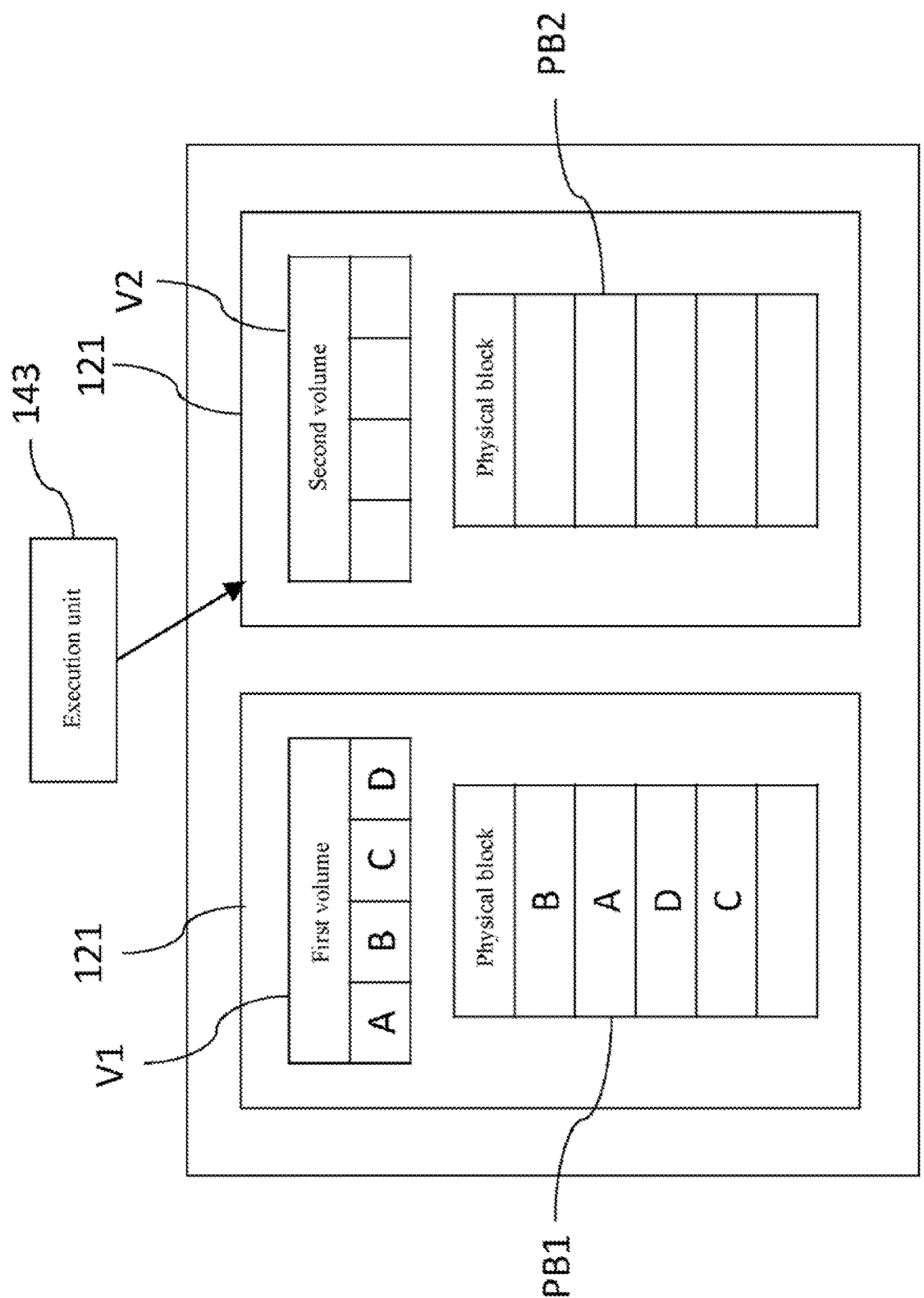
FIG. 4 is a schematic diagram (2) of data migration according to an embodiment of the present invention.

Subsequently, an adjustment unit 142 switches an execution object of the read/write action to a second volume V2 (step S302), as shown in FIG. 4. In this case, switching of the execution object is not limited to the read/write action, but further includes subsequent read/write actions that are to be executed on the first volume V1 by a user.

After the execution object is switched to the second volume V2, step S303 is performed. The locking unit 141 releases the read/write action so that a subsequent read/write action is executed on the second volume V2.

Finally, in step S304, an execution unit 143 migrates data in the first volume V1 to the second volume V2. Using the example shown in FIG. 2 for description, data A, B, C, and D is stored in the first volume V1 and is stored in a physical block PB1. The physical block PB1 is physical storage space. In this case, it is not necessary for a storage sequence of corresponding data stored in the physical block PB1 to correspond to a storage sequence of data in the first volume V1. For example, in this case, data stored in the physical block PB1 is data B, A, D, and C in sequence, and the sequence is different from a storage sequence of data A, B, C, and D in the first volume V1. Generally, the storage module 120 further stores a contrast table (not shown in the figure), and the contrast table records a correspondence between data in the logical storage space and in the physical storage space. In this way, the execution unit 143 may migrate, read, or write data in the logical storage space and the physical storage space.

Figure 5:
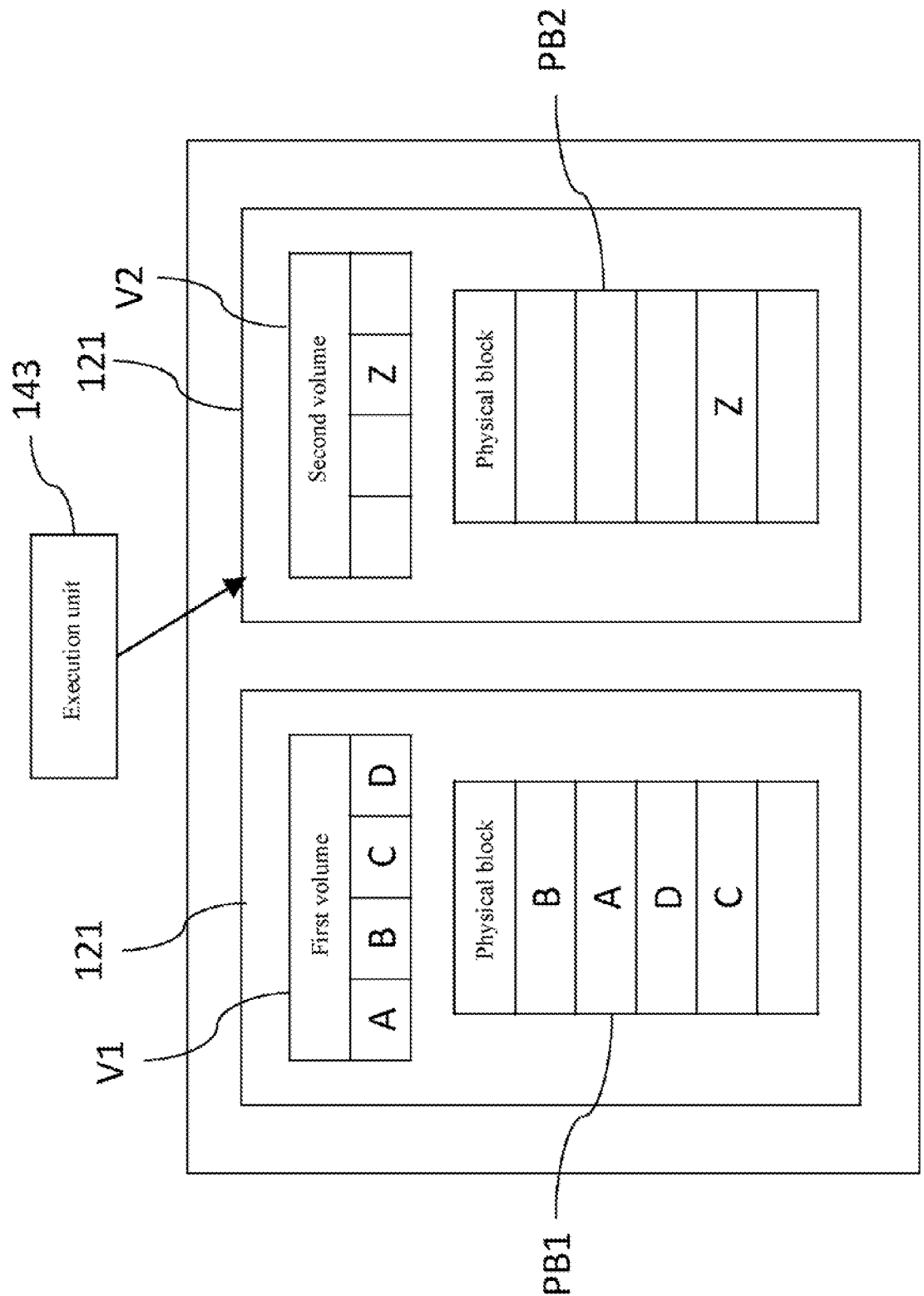
FIG. 5 is a schematic diagram (3) of data migration according to an embodiment of the present invention.

Referring to FIG. 5, FIG. 5 is a schematic diagram (3) of data migration according to an embodiment of the present invention. During prevention in step S301, if the user executes the write action, after the read/write action is released in step S303, the execution unit 143 extracts an instruction that corresponds to one or more read/write actions and that is in the queue, and executes the read/write actions on the second volume V2. That is, data is written to an address that corresponds to a write address of the first volume V1 and that is in the second volume V2. For example, data Z is written to an address of original data C.

In some embodiments, or in a process of data migration, the execution unit 143 executes, according to a newly-received instruction, an action of writing other data to write the data to a switched execution object of a read/write action (which is the second volume V2 herein). In an embodiment, if the data of a to-be-written address is null, it means that the data of an address corresponding to the first volume V1 is also null or data of an address corresponding to the first volume V1 is not migrated. In this way, to-be-written data may be directly written to the second volume V2. If there is data stored at the to-be-written address in the second volume V2, it means that the data is migrated from the first volume V1, so that the to-be-written data is overwritten at the address.

Figure 6:
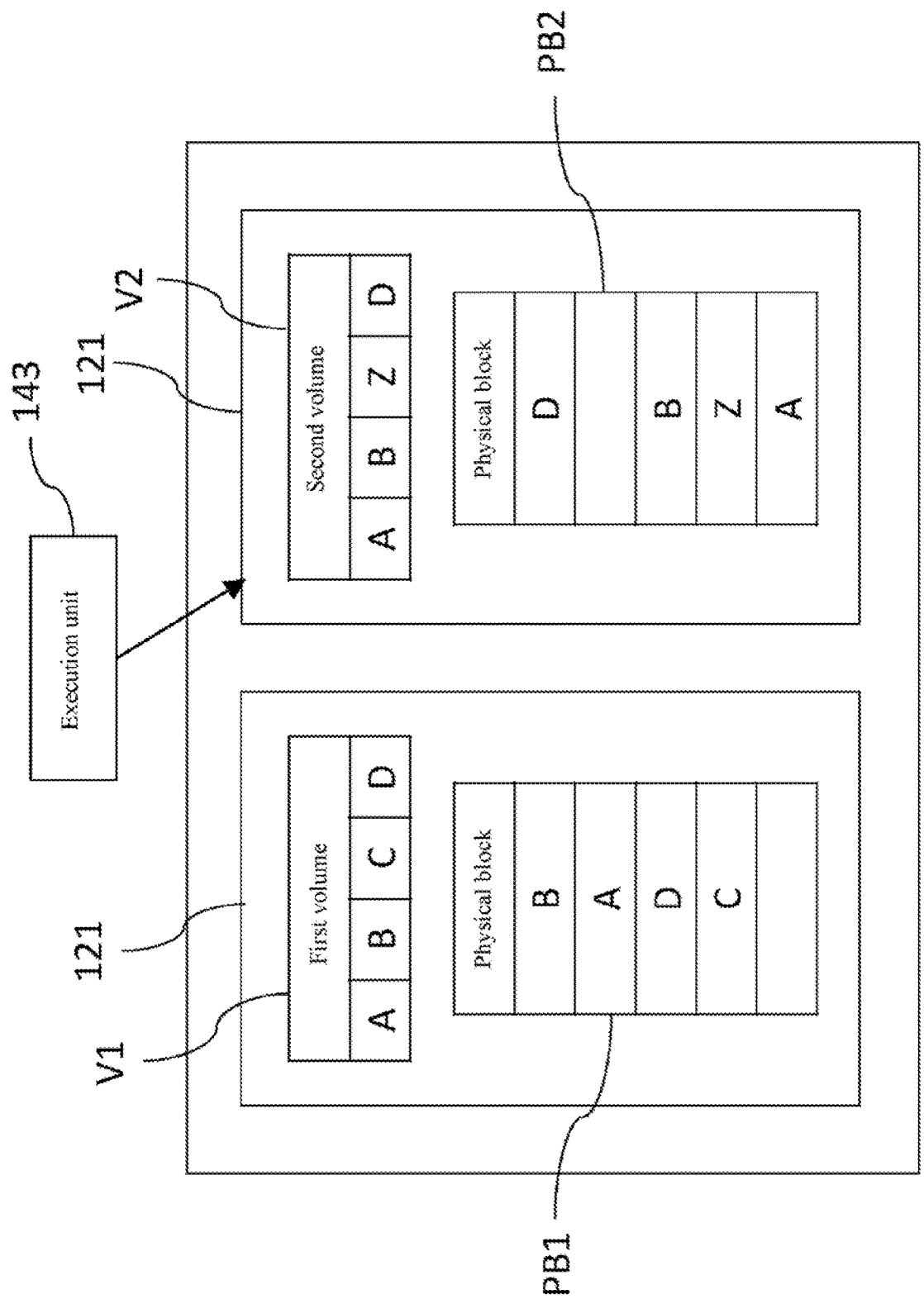
FIG. 6 is a schematic diagram (4) of data migration according to an embodiment of the present invention.

Referring to FIG. 6, FIG. 6 is a schematic diagram (4) of data migration according to an embodiment of the present invention. During migration, if the second volume V2 already has data, content that corresponds to the address to which data exists and that is in the first volume V1 is not migrated to the second volume V2. For example, new data Z already exists at an address at which data C is supposed to be written and that is in the second volume V2, so that data C in the first volume V1 is not migrated to the second volume V2. On the contrary, if the second volume V2 does not have an address at which data exists, data corresponding to an address in the first volume V1 is migrated to the second volume V2 (in this example, which is data A, B, or D). By means of step S301 to step S304, the user is allowed to perform the read/write action during data migration, so that the user does not interrupt an operation due to data migration.

In an embodiment, after step S304, the second volume V2 already stores all data that needs to be migrated from the first volume V1. In this way, the execution unit 143 may delete the first volume V1.

In an embodiment, if the foregoing read/write action is a read action, the execution unit 143 reads, according to a received instruction, a read address of the second volume V2. If no data is read from the read address of the second volume V2, it means that data at a corresponding address of the first volume V1 is not migrated or an address corresponding to the first volume V is also null. In this way, the execution unit 143 reads an address that corresponds to the read address and that is in the first volume V1. It should be noted that the execution unit 143 herein reads data in the first volume V1, but an execution object of the read/write action is not switched, and a subsequent read/write action is still executed on the second volume. In another case, the execution unit 143 reads, according to the received instruction, the read address of the second volume V2. When data is read from the read address, the data may be data migrated from the first volume V1 or may be newly-written data. In any case, the data is the latest data, so that correct data may be read.

Figure 7:
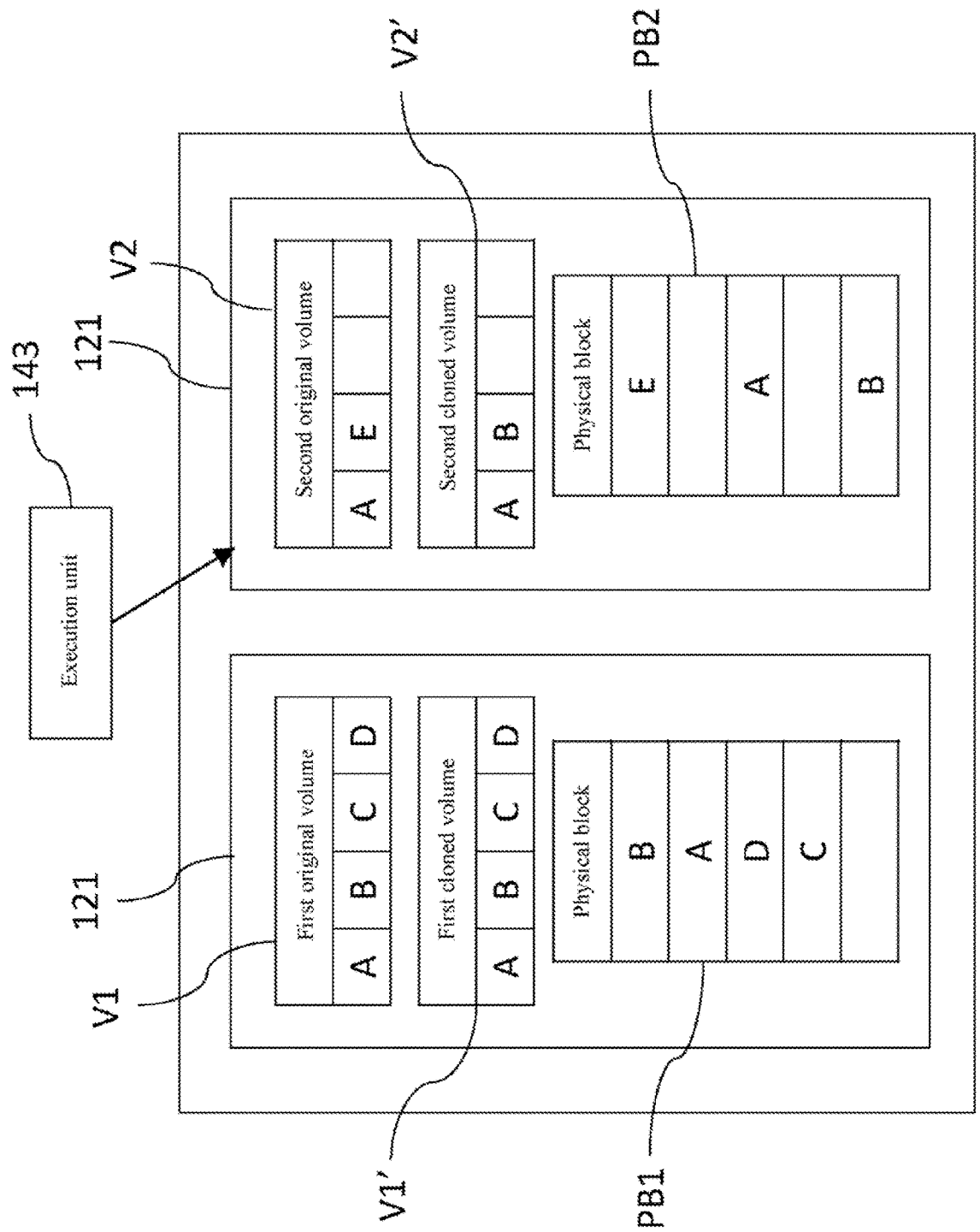
FIG. 7 is a schematic diagram (5) of data migration according to an embodiment of the present invention.

In an embodiment, the volume may further include an original volume and a cloned volume of the original volume. As shown in FIG. 7, FIG. 7 is a schematic diagram (5) of data migration according to an embodiment of the present invention. A cloned volume of the foregoing first volume V1 (referred to as "a first original volume V1" herein) is a first cloned volume V1'. The first original volume V1 shares a same physical block PB1 with the first cloned volume V1'. That is, data of the first original volume V1 is the same as that of the first cloned volume V1', but the data only occupies space of a piece of data in the physical block PB1. FIG. 7 describes that during data migration (migration of data A is completed), if there is a new write instruction, data is written to a to-be-written volume according to the write instruction. Herein, using writing to a second original volume V2 as an example, the execution unit 143 writes data E to the second original volume V2, and the data E is stored in a corresponding physical block PB2. Data is migrated to a corresponding address, to which no data is written, of a second cloned volume V2'. Data B stored at a corresponding address of the first cloned volume V1' is also stored in the physical block PB2 correspondingly. It can be seen that new data E is written to a second address of the second original volume V2, but no new data is written to a second address of the second cloned volume V2', and data B migrated from a second address of the first cloned volume V1' is stored at the second address of the second cloned volume V2'. In this way, the second address of the second original volume V2 does not share a same physical address with the second address of the second cloned volume V2'. The second original volume V2 and the second cloned volume V2' separately occupy one address in the physical block PB2 to store data.

Figure 8:
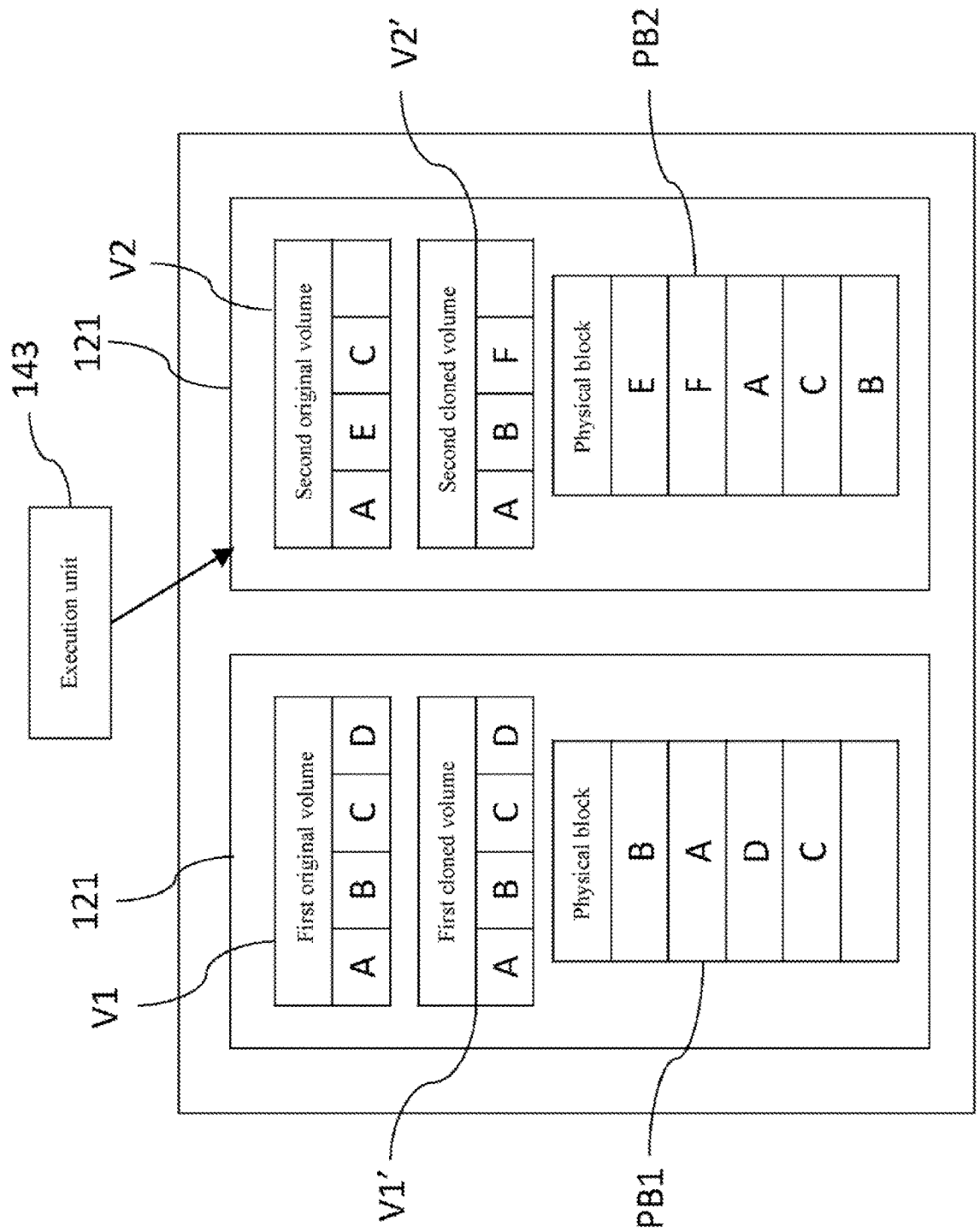
FIG. 8 is a schematic diagram (6) of data migration according to an embodiment of the present invention.

Further referring to FIG. 8, FIG. 8 is a schematic diagram (6) of data migration according to an embodiment of the present invention. In another case of the example, that is, when new data is written to the second cloned volume V2' during migration, the execution unit 143 writes data F to the second cloned volume V2', and data F is stored in the corresponding physical block PB2. Data is migrated to a corresponding address, to which no data is written, of a second original volume V2. Data C stored at a corresponding address of the first original volume V1 is also stored in the physical block PB2 correspondingly.

In the method and electronic device for executing data reading/writing in volume migration according to the embodiments of the present invention, data migration can be performed without affecting a user operation. In addition, a read/write action of a user may be prevented temporarily in step S301 and step S302, but a time consumed is only several milliseconds, and the user operation is not affected.

What is claimed is:

1. A method for executing data reading/writing in volume migration, comprising:
    preventing a read/write action on a first volume during a temporary period before migrating data from the first volume to a brand new second volume, wherein an execution object of the read/write action is the first volume;
    switching the execution object of the read/write action from the first volume to the second volume in the temporary period;
    releasing the read/write action at the end of the temporary period so that the read/write action is executed on the second volume after the temporary period; and
    migrating data in the first volume to the second volume, and during migration, skipping migrating a first content at a first address in the first volume to the second volume if the second volume already has second content at a second address which the first content will be migrated to.

2. The method for executing data reading/writing in volume migration according to claim 1, wherein the read/write action is reading according to a read address of the second volume.

3. The method for executing data reading/writing in volume migration according to claim 2, wherein if no data is read from the read address of the second volume, data is read from an address that corresponds to the read address and that is in the first volume.

4. The method for executing data reading/writing in volume migration according to claim 1, wherein the read/write action is writing data to an address that corresponds to a write address of the first volume and that is in the second volume.

5. The method for executing data reading/writing in volume migration according to claim 1, wherein the first volume is a cloned volume of an original volume.

6. An electronic device for executing data read/write in volume migration, comprising:
    a storage module, comprising a plurality of volumes, wherein the plurality of volumes comprises a first volume and a second volume; and
    a control module, performing the method for executing data reading/writing in volume migration, wherein the method comprises:
    preventing a read/write action on a first volume during a temporary period before migrating data from the first volume to a brand new second volume, wherein an execution object of the read/write action is the first volume;
    switching the execution object of the read/write action from the first volume to the second volume in the temporary period;
    releasing the read/write action at the end of the temporary period so that the read/write action is executed on the second volume after the temporary period; and
    migrating data in the first volume to the second volume, and during migration, skipping migrating a first content at a first address in the first volume to the second volume if the second volume already has second content at a second address which the first content will be migrated to.

7. The electronic device for executing data reading/writing in volume migration according to claim 6, wherein when the read/write action is reading, the execution unit reads a read address of the second volume.

8. The electronic device for executing data reading/writing in volume migration according to claim 7, wherein if no data is read from the read address of the second volume, the execution unit reads data from an address that corresponds to the read address and that is in the first volume.

9. The electronic device for executing data reading/writing in volume migration according to claim 6, wherein when the read/write action is writing, the execution unit writes data to an address that corresponds to a write address of the first volume and that is in the second volume.

10. The electronic device for executing data reading/writing in volume migration according to claim 6, wherein the first volume is a cloned volume of an original volume.

* * * * *